(12) United States Patent
Uno

(10) Patent No.: US 10,884,408 B2
(45) Date of Patent: Jan. 5, 2021

(54) VEHICLE COMMUNICATION SYSTEM AND VEHICLE CONTROL DEVICE

(71) Applicant: TOYOTA JIDOSHA KABUSHIKI KAISHA, Toyota (JP)

(72) Inventor: Satoshi Uno, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 15/890,638

(22) Filed: Feb. 7, 2018

(65) Prior Publication Data

US 2018/0231977 A1 Aug. 16, 2018

(30) Foreign Application Priority Data

Feb. 16, 2017 (JP) ................................ 2017-026883

(51) Int. Cl.
*G05D 1/00* (2006.01)
*G05D 1/02* (2020.01)
(Continued)

(52) U.S. Cl.
CPC ........... *G05D 1/0061* (2013.01); *B60W 10/04* (2013.01); *B60W 10/18* (2013.01); *B60W 10/20* (2013.01); *B60W 50/082* (2013.01); *G01C 21/3461* (2013.01); *G05D 1/0212* (2013.01); *G05D 1/0276* (2013.01); *G05D 1/0297* (2013.01); *B60W 2556/50* (2020.02); *B60W 2710/0605* (2013.01); *B60W 2710/08* (2013.01);
(Continued)

(58) Field of Classification Search
CPC .. G05D 1/0061; G05D 1/0212; G05D 1/0276; G05D 1/0297; G05D 2201/0213; B60W 10/04; B60W 10/18; B60W 10/20; B60W 50/082; B60W 2556/50; B60W 2710/0605; B60W 2710/08; B60W 2710/18; B60W 2710/20; B60W 2720/106; G01C 21/3461
USPC ......................................................... 701/25
See application file for complete search history.

(56) References Cited

U.S. PATENT DOCUMENTS

| | | |
|---|---|---|
| 2011/0144905 A1 | 6/2011 | Tahara |
| 2013/0080054 A1 | 3/2013 | Kutomi |

(Continued)

FOREIGN PATENT DOCUMENTS

| | | |
|---|---|---|
| CN | 104925053 A | 9/2015 |
| CN | 104925064 A | 9/2015 |

(Continued)

*Primary Examiner* — Paula L Schneider
(74) *Attorney, Agent, or Firm* — Sughrue Mion, PLLC

(57) ABSTRACT

A vehicle communication system includes: a communication server and a vehicle control device. The vehicle control device (102) includes at least one electronic control unit configured to: recognize a position of the host vehicle; acquire section information on the communication established section and the communication interrupted section; determine in which section, either the communication established section or the communication interrupted section, the host vehicle is traveling or is to travel; perform system driven control of the host vehicle based on the road condition information when the host vehicle travels in the communication established section; and perform driver driven control of the host vehicle when the host vehicle travels in the communication interrupted section.

16 Claims, 6 Drawing Sheets

(51) Int. Cl.
*B60W 10/04* (2006.01)
*B60W 10/18* (2012.01)
*B60W 10/20* (2006.01)
*B60W 50/08* (2020.01)
*G01C 21/34* (2006.01)

(52) U.S. Cl.
CPC ..... *B60W 2710/18* (2013.01); *B60W 2710/20* (2013.01); *B60W 2720/106* (2013.01); *G05D 2201/0213* (2013.01)

(56) References Cited

U.S. PATENT DOCUMENTS

| | | |
|---|---|---|
| 2015/0241878 A1 | 8/2015 | Crombez et al. |
| 2015/0266488 A1 | 9/2015 | Solyom et al. |
| 2015/0266489 A1 | 9/2015 | Solyom et al. |
| 2015/0281906 A1 | 10/2015 | Tseng et al. |
| 2016/0305787 A1 | 10/2016 | Sato et al. |
| 2017/0010612 A1* | 1/2017 | Asakura ................. G01S 13/87 |
| 2017/0164423 A1* | 6/2017 | Ross ..................... H04W 4/025 |

FOREIGN PATENT DOCUMENTS

| | | |
|---|---|---|
| JP | 2004-245758 A | 9/2004 |
| JP | 2013-68916 A | 4/2013 |
| JP | 2014-106854 A | 6/2014 |
| JP | 2016-207064 A | 12/2016 |
| JP | 2016-224872 A | 12/2016 |

\* cited by examiner

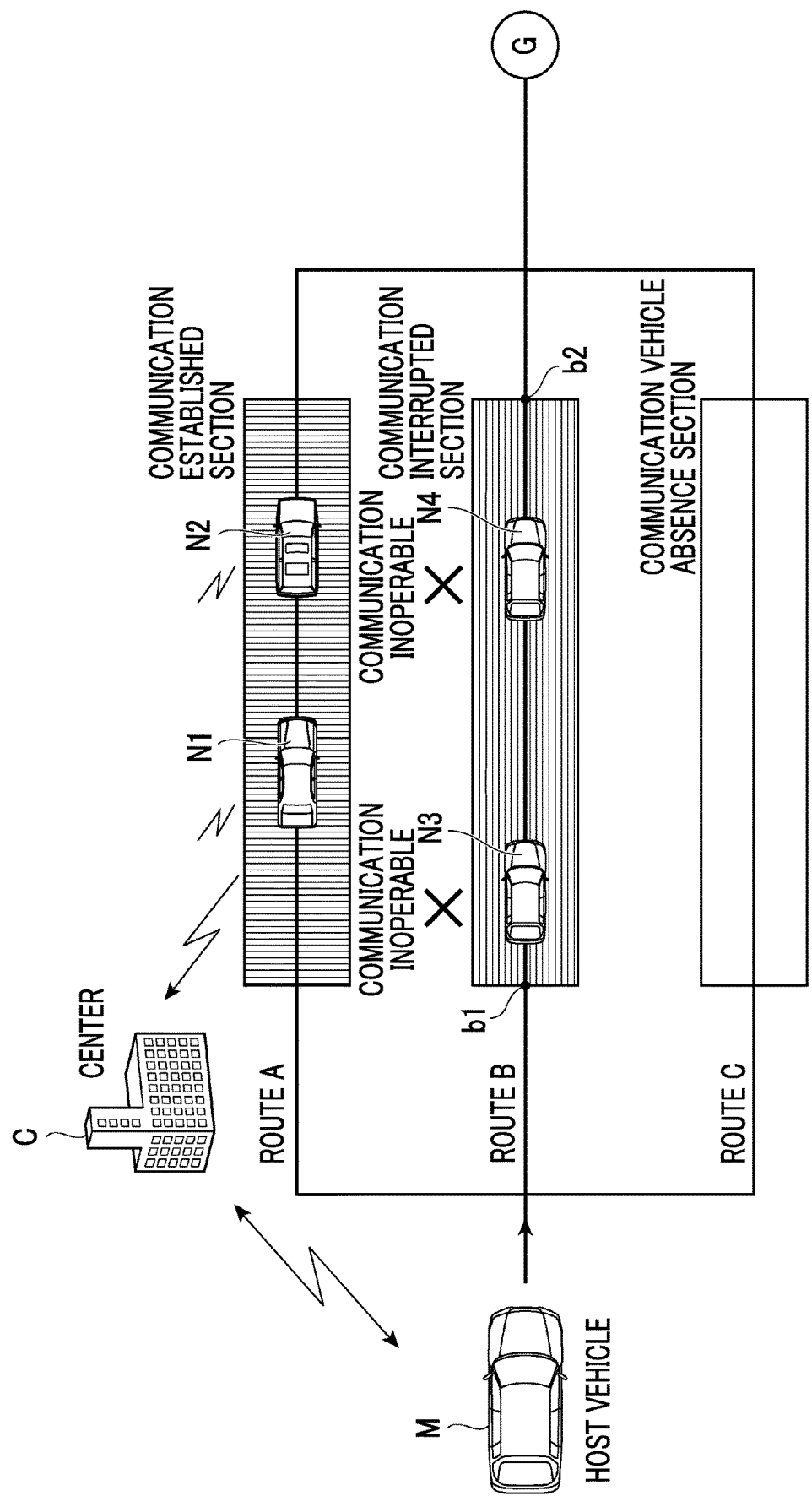

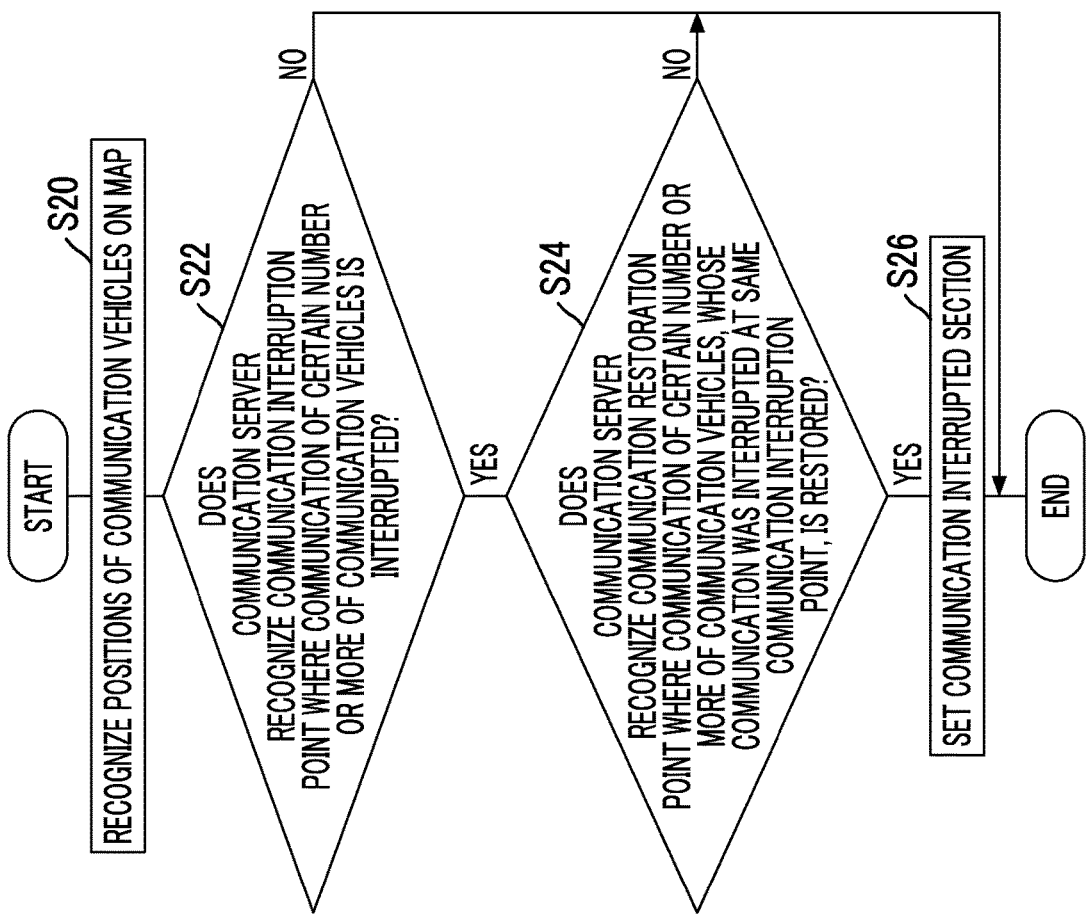
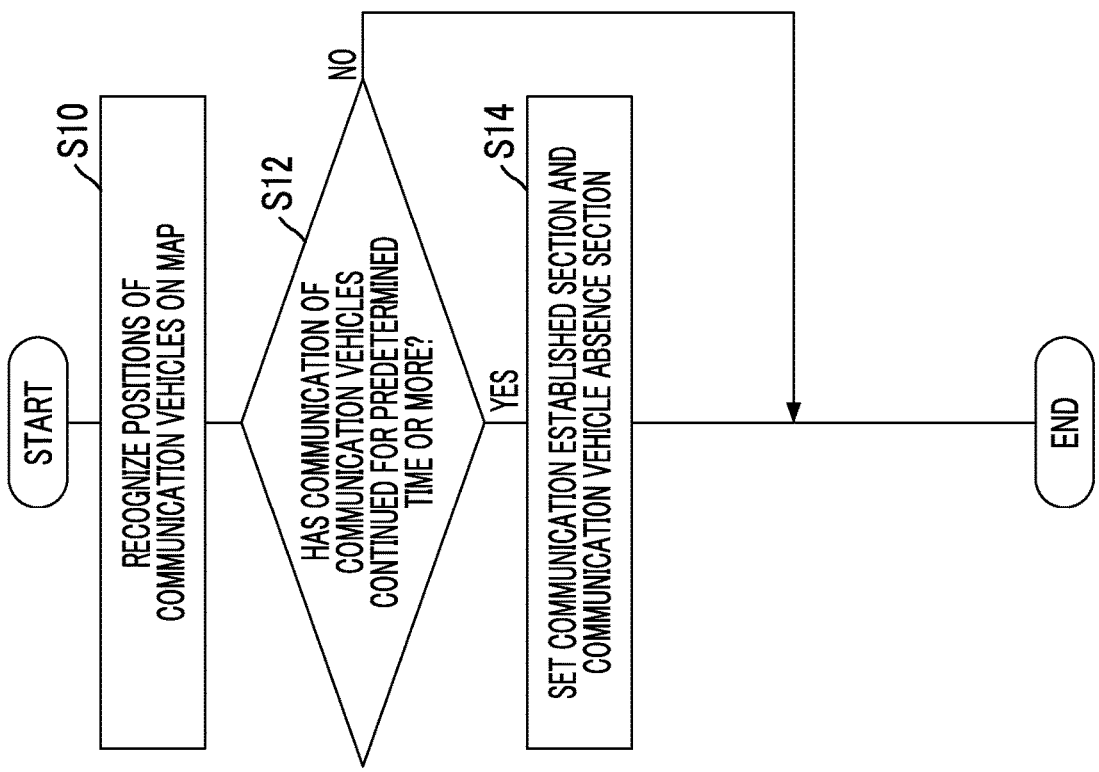

VEHICLE COMMUNICATION SYSTEM AND VEHICLE CONTROL DEVICE

INCORPORATION BY REFERENCE

The disclosure of Japanese Patent Application No. 2017-026883 filed on Feb. 16, 2017 including the specification, drawings and abstract is incorporated herein by reference in its entirety.

BACKGROUND

1. Technical Field

The present disclosure relates to a vehicle communication system and a vehicle control device.

2. Description of Related Art

As a technical document relating to a vehicle communication system, Japanese Patent Application Publication No. 2004-245758 (JP 2004-245758 A) is known. This publication describes a system for managing traffic information via network communication with vehicles, wherein the traffic information on a route on which a first mobile body has passed through is sent to a second mobile body.

SUMMARY

When executing complicated vehicle control such as autonomous driving, it is desirable to acquire various information, provided by the preceding vehicle, via network communication. However, in an environment where communication is difficult, the host vehicle cannot acquire sufficient information through communication, which may affect the execution of vehicle control.

The present disclosure provides a vehicle communication system and a vehicle control device capable of executing appropriate vehicle control according to the communication environment of a section in which the host vehicle travels.

A first aspect of the disclosure provides a vehicle communication system. The vehicle communication system according to the first aspect includes a communication server configured to communicate road condition information with a plurality of communication vehicles, the communication vehicles being vehicles configured to communicate with the communication server, the communication server being configured to recognize positions of communicating communication vehicles on a map via communication with the communication vehicles, the communicating communication vehicles being the plurality of communication vehicles in communication with the communication server, and set a communication established section and a communication interrupted section on the map, based on the positions of the communicating communication vehicles on the map; and a vehicle control device configured to communicate with the communication server and configured to perform vehicle control of a host vehicle using an actuator mounted on the host vehicle, the host vehicle being configured to acquire the road condition information from the communication server, the vehicle control device including at least one electronic control unit configured to recognize a position of the host vehicle on the map, acquire section information on the communication established section and the communication interrupted section, determine in which section, either the communication established section or the communication interrupted section, the host vehicle is traveling or is to travel, based on the position of the host vehicle on the map and the section information, and perform system driven control of the host vehicle based on the road condition information when the host vehicle travels in the communication established section, and perform driver driven control of the host vehicle when the host vehicle travels in the communication interrupted section.

According to the vehicle communication system in one aspect of the present disclosure, a communication established section and a communication interrupted section are set on the map based on the positions of the communicating communication vehicles on the map, the system driven control of the host vehicle is performed when the host vehicle travels in a communication established section and, at the same time, the driver driven control of the host vehicle is performed when the host vehicle travels in a communication interrupted section. Therefore, the vehicle communication system can perform vehicle control appropriately according to the communication environment of a section in which the host vehicle travels.

In the first aspect, the at least one electronic control unit may be configured to set, as the communication established section, a section in which a communication vehicle of the plurality of communication vehicles that have continued communication with the communication server for a predetermined time or more are traveling, based on the positions of the communicating communication vehicles on the map, and set, as the communication interrupted section, a section in which a certain number or more of communication vehicles of the plurality of communication vehicles have communication interrupted, based on the positions of the communicating communication vehicles on the map.

In the first aspect, the at least one electronic control unit may be configured to set the communication established section, the communication interrupted section, and a communication vehicle absence section on the map based on the positions of the communicating communication vehicles on the map. The at least one electronic control unit may be configured to acquire the section information on the communication established section, the communication interrupted section, and the communication vehicle absence section that are set on the map. The at least one electronic control unit may be configured to determine the host vehicle is traveling or is to travel in which section of the communication established section, the communication interrupted section, or the communication vehicle absence section, based on the position of the host vehicle on the map and the section information. The at least one electronic control unit may be configured to perform the driver driven control when the host vehicle travels in the communication vehicle absence section.

According to this vehicle communication system, a communication vehicle absence section is further set on the map based on the positions of the communicating communication vehicles on the map and, when the host vehicle travels in a communication vehicle absence section, the driver driven control is performed. Therefore, the vehicle communication system can perform the vehicle control of the host vehicle appropriately considering a section in which there is no communication vehicle.

In the first aspect, the at least one electronic control unit may be configured to set, as the communication vehicle absence section, a section in which there is no communicating communication vehicle, based on the positions of the communication vehicles on the map.

In the first aspect, the at least one electronic control unit may be configured not to perform the system driven control in the communication established section when a length of the communication established section in which the host vehicle not performing the system driven control travels is equal to or less than a threshold value.

According to this vehicle communication system, the system driven control is not performed if the system driven control can be executed only for a short period of time and, immediately after the short period of time, the vehicle control is switched again to the driver driven control. Therefore, the vehicle communication system can avoid the frequent switching of vehicle control.

In the first aspect, the at least one electronic control unit may be configured to release a setting of the communication established section when a first setting time has elapsed since the communication established section was set on the map, and release a setting of the communication interrupted section when a second setting time has elapsed since the communication interrupted section was set on the map.

According to this vehicle communication system, the setting of a communication established section of the setting of a communication interrupted section is released when a certain time has elapsed, considering that the communication environment of a section varies with the elapse of time. Therefore, the vehicle communication system can perform vehicle control appropriately according to the actual communication environment.

In the first aspect, the first setting time may be 30 seconds or more and 1 minute or less, and the second setting time may be 30 seconds or more and 3 minutes or less.

In the first aspect, the at least one electronic control unit may be configured to generate a travel plan including candidates of a plurality of routes on which the host vehicle will travel before arriving at a destination, based on the position of the host vehicle on the map and the section information.

In the first aspect, the at least one electronic control unit may be configured to determine, from the candidates of the routes, a traveling route on which the host vehicle will travel based on the section information.

In the first aspect, the at least one electronic control unit may be configured to determine, from the candidates of the routes, a route including a maximum number of the communication established section as a traveling route on which the host vehicle will travel, based on the section information.

In the first aspect, the system driven control may be traveling control under which the vehicle control device performs acceleration, deceleration, and steering of the host vehicle autonomously, and the driver driven control may be traveling control under which the host vehicle travels based on a driving operation of a driver of the host vehicle.

The second aspect of the disclosure provides a vehicle control device. The vehicle control device according to the second aspect includes: at least one electronic control unit configured to recognize a position of a host vehicle on a map; acquire section information on a communication established section and a communication interrupted section via communication with a communication server configured to communicate road condition information with a plurality of communication vehicles, the communication vehicles being vehicles configured to communicate with the communication server, the communication established section and the communication interrupted section being set on the map by the communication server based on a status of communication with the communication vehicles; determine in which section, either the communication established section or the communication interrupted section, the host vehicle is traveling, or is to travel, based on the position of the host vehicle on the map and the section information; perform vehicle control of the host vehicle using an actuator mounted on the host vehicle, in such a way that system driven control of the host vehicle is performed, based on the road condition information acquired from the communication server, when the host vehicle travels in the communication established section; and perform driver driven control of the host vehicle is performed when the host vehicle travels in the communication interrupted section.

According to the vehicle control device in another aspect of the present disclosure, the system driven control of the host vehicle is performed when the host vehicle travels in a communication established section and, at the same time, the driver driven control of the host vehicle is performed when the host vehicle travels in a communication interrupted section, using the communication established sections and the communication interrupted sections that are set by the communication server described above. Therefore, the vehicle control device can perform vehicle control appropriately according to the environment of a section in which the host vehicle travels.

The third aspect of the disclosure provides a vehicle communication system. The vehicle communication system according to the third aspect includes: a communication server configured to communicate road condition information with a plurality of communication vehicles, the communication vehicles being vehicles configured to communicate with the communication server, the communication server being configured to recognize positions of communicating communication vehicles on a map via communication with the communication vehicles, the communicating communication vehicles being the plurality of communication vehicles in communication with the communication server, and set a communication established section and a communication interrupted section on the map, based on the positions of the communicating communication vehicles on the map; and a vehicle control device configured to communicate with the communication server and configured to perform vehicle control of a host vehicle using an actuator mounted on the host vehicle, the host vehicle being configured to acquire the road condition information from the communication server, the vehicle control device including at least one electronic control unit configured to recognize a position of the host vehicle on the map, to acquire section information on the communication established section and the communication interrupted section, to determine in which section, either the communication established section or the communication interrupted section, the host vehicle is traveling, or is to travel, based on the position of the host vehicle on the map and the section information, to perform a driving assistance when the host vehicle travels in the communication interrupted section, and perform high-level driving assistance, the high-level driving assistance having a higher level of intervention in driving control of the vehicle control device than the driving assistance, based on the road condition information when the host vehicle travels in the communication established section.

As described above, according to the vehicle communication system in one aspect and the vehicle control device in another aspect of the present disclosure, vehicle control can be performed appropriately according to the communication environment of a section in which the host vehicle travels.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram showing the setting of sections;

FIG. 3A is a flowchart showing the setting processing of a communication established section and a communication vehicle absence section;

FIG. 3B is a flowchart showing the setting processing of a communication interrupted section;

DETAILED DESCRIPTION OF EMBODIMENTS

Embodiments of the present disclosure will be described below with reference to the drawings.

[Configuration of Vehicle Communication System]

Figure 1:
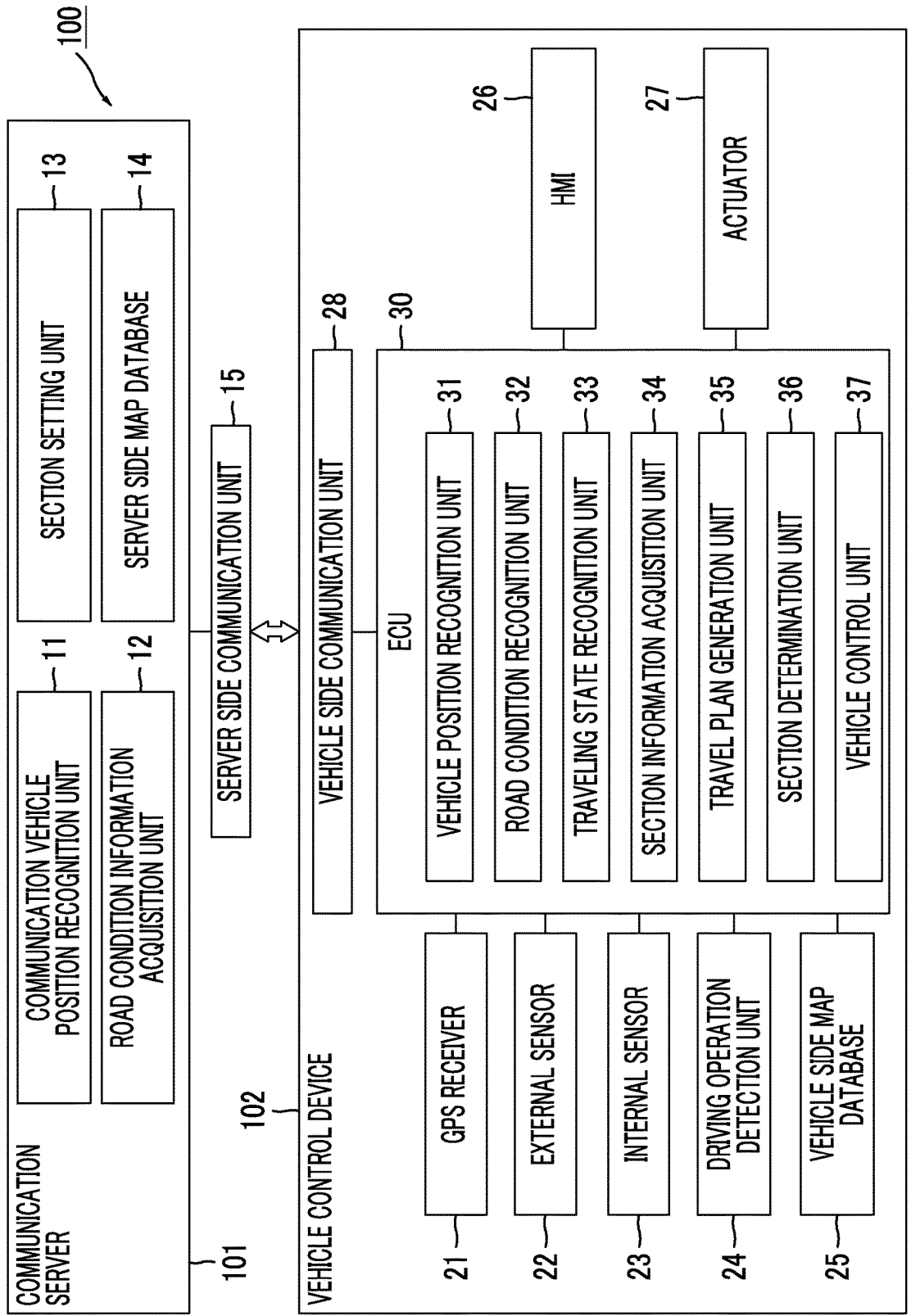
FIG. 1 is a block diagram showing a vehicle communication system according to an embodiment.

FIG. 1 is a block diagram showing a vehicle communication system according to an embodiment. A vehicle communication system 100 shown in FIG. 1 is a system that includes a communication server 101 and a vehicle control device 102.

<Configuration of Communication Server>

First, the communication server 101 will be described. The communication server 101, provided in facilities such as an information management center, communicates with a plurality of communication vehicles. A communication vehicle is a vehicle having the function to communicate with the communication server 101. In general, a communication vehicle has the function to recognize the position of the vehicle on the map and the function to recognize road conditions outside the vehicle.

The communication server 101 is configured as a general computer that includes a CPU, a storage unit, and a communication control unit. The storage unit may be a ROM and/or a RAM, or may be a storage medium such as an HDD configured as a Redundant Array Soft Inexpensive Disks (RAID) configuration. The storage unit may be provided outside the communication server 101. The communication control unit is a communication device such as a network card that controls communication. Each function of the communication server 101 is realized by a combination of the operations of the hardware devices described above. The communication server 101 may be configured by a plurality of computers. The communication server 101 may be a cloud server.

The communication server 101 is connected to a server side communication unit 15 that is provided for communication with the host vehicle (vehicle control device 102). The server side communication unit 15 is, for example, the communication facilities of the center where the communication server 101 is provided.

The communication server 101 includes a communication vehicle position recognition unit 11, a road condition information acquisition unit 12, a section setting unit 13, and a server side map database 14.

The communication vehicle position recognition unit 11 recognizes the positions of communication vehicles on the map via communication with a plurality of communication vehicles. For example, the communication vehicle position recognition unit 11 recognizes the positions of the communication vehicles on the map by acquiring the information on the positions on the map (such as GPS information), recognized by each of the communication vehicles, from a plurality of communication vehicles.

The road condition information acquisition unit 12 acquires the road condition information, which is the information on the road condition recognized by each of the communication vehicles, via communication with a plurality of communication vehicles. Examples of road conditions include the conditions of obstacles on the road on which the communication vehicle travels (conditions of moving obstacles such as other vehicles, bicycles, and pedestrians, and conditions of stationary obstacles such as utility poles, guardrails, and buildings). The road condition information acquisition unit 12 acquires the road condition information in association with the information on the positions of the communication vehicles on the map. The communication server 101 provides various information, such as the road condition information, to a communication vehicle in response to a request.

The section setting unit 13 sets a communication established section, a communication interrupted section, and a communication vehicle absence section on the map, based on the status of communication between a communication vehicle and the communication server 101. More specifically, the section setting unit 13 sets a communication established section, a communication interrupted section, and a communication vehicle absence section, based on the positions of the communication vehicles on the map recognized by the communication vehicle position recognition unit 11. A communication established section is a section where communication between the communication server 101 and a communication vehicle is established. A communication vehicle absence section is a section where there is no communication vehicle. A communication interrupted section is a section where communication between the communication server 101 and a communication vehicle is interrupted. Communication interrupted sections include a section where the communication server 101 and the host vehicle cannot communicate because of a structural reason (a canyon of buildings, a tunnel, and an underground parking lot) and a section where the communication is temporarily interrupted (the influence of the weather (thunderstorms etc.), the influence of radio disturbances due to the testing of radio wave test equipment, or the operation of a power plant).

A communication established section, a communication interrupted section, and a communication vehicle absence section may be set separately for each lane, or may be set for a road without distinguishing lanes. In addition, a communication established section, a communication interrupted section, and a communication vehicle absence section may be distinguished by Level of Service [LOS] labels. For example, a communication established section may be assigned a LOS label 3, a communication vehicle absence section may be assigned a LOS label 2, and a communication interrupted section may be assigned a LOS label 1.

The section setting unit 13 sets a communication established section based on the position of a communication vehicle on the map when the communication vehicle is in communication with the communication server 101. For example, when the communication between the communication server 101 and a communication vehicle continues for a predetermined time or more, the section setting unit 13 sets the section, where the communication vehicle in communication with the communication server 101 travels, as a communication established section. A communication established section may be set as a section that crosses an intersection or a branch road.

The section setting unit 13 sets a section as a communication vehicle absence section if there is no communicating communication vehicle, based on the positions of the communication vehicles on the map that are in communication with the communication server 101. The section setting unit 13 does not necessarily have to set a communication vehicle absence section.

The section setting unit 13 sets a communication interrupted section based on the interruption of communication, and the restoration of communication, of communication vehicles. If a communication vehicle absence section is set, the section setting unit 13 overwrites a communication interrupted section on the communication vehicle absence section. The section setting unit 13 recognizes a communication interruption point (the start point of a communication interrupted section) based on the recognition result of the communication vehicle position recognition unit 11. The interruption point described above is a point where the communication of a certain number or more of communication vehicles is interrupted. The section setting unit 13 may recognize a point where a certain number or more of communication vehicles have the communication interrupted within a predetermined time as the communication interruption point, considering an elapse of time.

The certain number of communication vehicles may be a fixed number or may be a number different depending on the shape of the road (for example, depending on whether the road is a double-lane road or a single-lane road). It is not necessary to include the same vehicle in the certain number of communication vehicles. The predetermined time may be a fixed value or may be different depending on the shape of the road (for example, depending on whether the road is a double-lane road or a single-lane road).

The section setting unit 13 recognizes a communication restoration point (the end point of a communication interrupted section) based on the recognition result of the communication vehicle position recognition unit 11. The communication restoration point described above is a point where the communication is restored between a certain number of more of communication vehicles that have the communication interrupted at the same communication interruption point and the communication server 101. The certain number or more of communication vehicles do not need to be the same as the communication vehicles used when recognizing the communication interruption point. The section setting unit 13 may recognize a point where a certain number or more of communication vehicles have the communication interrupted within a predetermined time as the communication interruption point.

The section setting unit 13 sets the section between a communication interruption point and a communication restoration point as a communication interrupted section. The section setting unit 13 overwrites a communication vehicle absence section with a communication interrupted section. When a communication interruption point and a communication restoration point are recognized on the same road, the section setting unit 13 may set the section between these points as a communication interrupted section. The section setting unit 13 may set a communication interrupted section across an intersection or a branch. In this case, the section setting unit 13 recognizes a plurality of communication restoration points for one communication interruption point. That is, in this case, the communication interrupted section may have multiple exits for one entrance. The method for setting a communication interrupted section is not limited to the method described above.

When the setting of a communication established section and the setting of a communication interrupted section overlap, the section setting unit 13 treats the overlapping section as a communication established section. For a section where the setting of a communication established section and the setting of a communication interrupted section overlap, the section setting unit 13 may store the traveling trajectory of a communication vehicle with which communication has been established.

FIG. 2 is a diagram showing the setting of sections. FIG. 2 shows the host vehicle M, the center C, route A, route B, route C, communication vehicles N1 to N4, and the destination G. The host vehicle M is a vehicle that is controlled by the vehicle control device 102 of the vehicle communication system 100. The center C is facilities where the communication server 101 is installed. Communication vehicles N1 and N2 are vehicles communicating with the communication server 101 of the center C. Communication vehicles N1 and N2 are traveling on route A. Communication vehicles N3 and N4 are vehicles in the state in which communication with the communication server 101 of the center C is interrupted. Communication vehicles N3 and N4 are traveling on route B. There is no communication vehicle on route C.

In the situation shown in FIG. 2, the section setting unit 13 sets a communication established section on route A based on the positions of the communication vehicles N1 and N2 on the map that are communicating with the communication server 101. For example, the section setting unit 13 sets the section in which communication vehicles N1 and N2, which have been communicating with the communication server 101 for a predetermined time or more, are traveling as a communication established section. The section setting unit 13 sets route C, where there is no communication vehicle that is communicating with the communication server 101, as a communication vehicle absence section.

In addition, the section setting unit 13 recognizes the communication interrupted section on route B based on the communication interruption and the communication restoration of the communication vehicles N3 and N4. The section setting unit 13 recognizes the communication interruption point b1, at which the communication between the communication vehicles (N3 and N4) and the communication server 101 is interrupted, and the communication restoration point b2 at which the communication between the communication vehicles (N3 and N4) and the communication server 101 is restored. The section setting unit 13 recognizes the section between the communication interruption point b1 and the communication restoration point b2 as the communication interrupted section.

Next, the release of section setting will be described. The section setting unit 13 counts the elapsed time since a communication established section was set on the map. The section setting unit 13 counts the elapsed time based on the timer of the communication server 101. The section setting unit 13 releases the setting of the communication established section when the first setting time has elapsed since the communication established section was set. The first setting time is a time that is set in advance (for example, 30 seconds). The first setting time can be set to a time of 30 seconds or more and 1 minute or less.

Similarly, the section setting unit 13 counts the elapsed time since a communication interrupted section was set on the map. The section setting unit 13 counts the elapsed time based on the timer of the communication server 101. The section setting unit 13 releases the setting of the communication interrupted section when the second setting time has elapsed since the communication interrupted section was set. The second setting time is a time that is set in advance (for example, 30 seconds). The second setting time can be set to a time of 30 seconds or more and 3 minutes or less. The second setting time may be longer than the first setting time. By doing so, it is possible to easily release the setting of a communication interrupted section and avoid adverse effect on vehicle control.

After the setting of a communication established section or a communication interrupted section is released, the section setting unit 13 may set the setting-released section as a communication vehicle absence section if the setting of a communication established section or a communication interrupted section is not overwritten in the setting-released section.

The server side map database 14 is a database that stores map information. The server side map database 14 is a database that is used as the reference of the vehicle side map database 25 that will be described later. The server side map database 14 keeps the map information up-to-date by a known technique via communication with a communication vehicle such as a probe car.

The server side map database 14 stores the section information on a communication established section, a communication interrupted section, and a communication vehicle absence section that are set by the section setting unit 13. The section information may be stored in a database different from the server side map database 14.

<Configuration of Vehicle Control Device>

Next, the vehicle control device 102 will be described. The vehicle control device 102 is a device that performs the vehicle control of the host vehicle. The host vehicle may be a vehicle that functions as a communication vehicle described above or may be a vehicle that does not function as a communication vehicle. That is, the host vehicle does not necessarily have to be a device that provides information to the communication server 101. The vehicle control includes at least two types of control: system driven control and driver driven control. The vehicle control device 102 recognizes a request for starting the system driven control in response to a driver's operation. When the condition that is set by the driver in advance is satisfied, the vehicle control device 102 may automatically start the system driven control.

The system driven control is the traveling control of the host vehicle when the traveling is controlled mainly by the vehicle control device 102. The system driven control is, for example, autonomous driving control. The autonomous driving control is control in which the host vehicle travels autonomously without the driver performing the driving operation. The system driven control may be thought of as control corresponding to the so-called autonomous driving level 3 or autonomous driving level 4. In the system driven control, the vehicle control device 102 controls the acceleration, deceleration, and steering of the host vehicle.

The driver-driven control is the traveling control of the host vehicle when the host vehicle is driven mainly by the driver. The driver-driven control is provided, for example, in the form of driving assistance control, guidance control provided to the driver, and alerting control provided to the driver. The driving assistance control refers to the control provided to assist the driver in traveling of the host vehicle while the host vehicle is driven mainly by the driver's manual driving operation. The driving assistance control may include Lane Keeping Assist [LKA] and/or Adaptive Cruise Control [ACC]. The driving assistance control may be thought of as the control corresponding to the autonomous driving level 1 or autonomous driving level 2.

The vehicle control device 102 includes an Electronic Control Unit (ECU) 10 that integrally manages the device. The ECU 30 is an electronic control unit that includes a Central Processing Unit (CPU), a Read Only Memory (ROM), a Random Access Memory (RAM), and a Controller Area Network (CAN) communication circuit. The ECU 30 loads a program stored in the ROM into the RAM and causes the CPU to execute the program loaded into the RAM to implement various functions. The ECU 30 may be configured by a plurality of electronic control units.

The ECU 30 is connected to a GPS receiver 21, an external sensor 22, an internal sensor 23, a driving operation detection unit 24, a vehicle side map database 25, a Human Machine Interface [HMI] 26, an actuator 27, and a vehicle side communication unit 28.

The GPS receiver 21 receives signals from three or more GPS satellites to measure the position of the host vehicle (for example, the latitude and longitude of the host vehicle). The GPS receiver 21 sends the measured position information on the host vehicle to the ECU 30.

The external sensor 22 is a detection apparatus for detecting the surrounding situation of the host vehicle. The external sensor 22 includes at least one of a camera and a radar sensor.

The camera is a capturing apparatus that captures the external situation of the host vehicle. The camera is provided on the interior side of the windshield of the host vehicle. The camera sends the captured information on the external situation of the host vehicle to the ECU 30. The camera may be a monocular camera or a stereo camera. The stereo camera includes two capturing units arranged so that the disparity between the right eye and the left eye is reproduced. The information captured by the stereo camera also includes the depth direction information.

The radar sensor is a detection apparatus that detects an obstacle around the host vehicle using radio waves (for example, millimeter waves) or light. The radar sensor includes a millimeter radar or a Light Detection and Ranging (LIDAR). The radar sensor detects an obstacle by sending radio waves or light to the surroundings of the host vehicle and by receiving radio waves or light reflected by the obstacle. The radar sensor sends the detected obstacle information to the ECU 30. Obstacles include stationary obstacles such as guardrails and buildings as well as moving obstacles such as pedestrians, bicycles, and other vehicles.

The internal sensor 23 is a detection apparatus that detects the traveling state of the host vehicle. The internal sensor 23 includes a vehicle speed sensor, an acceleration sensor, and a yaw rate sensor. The vehicle speed sensor is a detection apparatus that detects the speed of the host vehicle. An example of the vehicle speed sensor is a wheel speed sensor that is provided on the wheels of the host vehicle or on the drive shaft that rotates in synchronization with the wheels to detect the rotation speed of the wheels. The vehicle speed sensor sends the detected vehicle speed information (wheel speed information) to the ECU 30.

The acceleration sensor is a detection apparatus that detects the acceleration of the host vehicle. The acceleration sensor includes a longitudinal acceleration sensor that detects acceleration in the longitudinal direction of the host vehicle and a lateral acceleration sensor that detects the lateral acceleration of the host vehicle. The acceleration sensor sends the acceleration information on the host vehicle to the ECU 30. The yaw rate sensor is a detection apparatus that detects the yaw rate (turning angle velocity) around the vertical axis at the center of gravity of the host vehicle. A gyro sensor may be used as the yaw rate sensor. The yaw rate sensor sends the detected yaw rate information on the host vehicle to the ECU 300.

The driving operation detection unit 24 detects the driver's driving operation. The driving operation detection unit 24 includes an accelerator pedal sensor, a brake pedal sensor, and a steering sensor. The driving operation detection unit 24 sends the detected driver's driving operation to the ECU 30.

The vehicle side map database 25 is a database that stores the map information. The vehicle side map database 25 is formed, for example, in the Hard Disk Drive [HDD] mounted on the host vehicle. The map information includes the position information on roads, the information on road shapes (for example, whether the road is a curved road or a straight road, the curvature of a curved road, and so on), the position information on intersections and branch points, the position information on structures, and so on. The map information includes the section information on the sections that are set on the map in advance. The vehicle side map database 25 carries out communication with the communication server 101 to update the map information as necessary with the server side map database 14 as its reference database. The vehicle side map database 25 may be provided in a server capable of communicating with the host vehicle.

The HMI 26 is an interface for outputting and inputting information between the driver and the vehicle control device 102. The HMI 26 has a display for displaying image information to the driver and operation buttons or a touch panel for allowing the driver to perform input operations. The HMI 26 sends the information received from the driver to the ECU 30. The HMI 26 displays image information on the display in response to the control signal from the ECU 30.

The actuator 27 is an apparatus used for controlling the host vehicle. The actuator 27 includes at least a throttle actuator, a brake actuator, and a steering actuator. The throttle actuator controls the amount of air to be supplied to the engine (throttle angle) according to the control signal from the ECU 30 to control the driving force of the host vehicle. When the host vehicle is a hybrid vehicle, the amount of air to be supplied to the engine is input to the engine and, in addition, the control signal from the ECU 30 is input to the motor, which works as the power source, to control the driving force. When the host vehicle is an electric vehicle, the control signal from the ECU 30 is input to the motor, which works as the power source, to control the driving force. The motor that works as power sources in these cases constitutes the actuator 27.

The brake actuator controls the brake system according to the control signal, received from the ECU 30, to control the braking force to be applied to the wheels of the host vehicle. As the brake system, a hydraulic brake system may be used. The steering actuator controls the driving of the assist motor, one component of the electric power steering system for controlling the steering torque, according to the control signal received from the ECU 30. By doing so, the steering actuator controls the steering torque of the host vehicle.

The vehicle side communication unit 28 is an apparatus for communicating with the communication server 101. The vehicle control device 102 sends and receives various information to and from the communication server 101 via the vehicle side communication unit 28. The communication format is not limited to a particular format.

Next, the functional configuration of the ECU 30 will be described. The ECU 30 includes a vehicle position recognition unit 31, a road condition recognition unit 32, a traveling state recognition unit 33, a section information acquisition unit 34, a travel plan generation unit 35, a section determination unit 36, and a vehicle control unit 37. The functions of the ECU 30 described below may also be executed, in part, by a server capable of communicating with the host vehicle.

The vehicle position recognition unit 31 recognizes the position of the host vehicle on the map based on the position information, received by the GPS receiver 21, and the map information stored in the vehicle side map database 25. In addition, the vehicle position recognition unit 31 recognizes the position of the host vehicle by the Simultaneous Localization and Mapping [SLAM] technology, using the position information on stationary obstacles, such as utility poles, included in the map information stored in the vehicle side map database 25 and the detection result detected by the external sensor 22. The vehicle position recognition unit 31 may recognize the position of the host vehicle on the map using other known methods.

The road condition recognition unit 32 recognizes the road condition of the road on which host vehicle is traveling, based on the detection result detected by the external sensor 22. The road conditions include the condition of obstacles on the road on which the host vehicle is traveling (moving obstacles such as other vehicles, bicycles, and pedestrians, and stationary obstacles such as utility poles, guardrails, and buildings). The road condition recognition unit 32 recognizes the road condition by a known method based on the image captured by the camera and the obstacle information sensed by the radar sensor.

The traveling state recognition unit 33 recognizes the traveling state of the host vehicle based on the detection result detected by the internal sensor 23. The traveling state includes the vehicle speed of the host vehicle, the acceleration of the host vehicle, and the yaw rate of the host vehicle. More specifically, the traveling state recognition unit 33 recognizes the vehicle speed of the host vehicle based on the vehicle speed information sensed by the vehicle speed sensor. The traveling state recognition unit 33 recognizes the acceleration of the host vehicle based on the acceleration information sensed by the acceleration sensor. The traveling state recognition unit 33 recognizes the direction of the host vehicle based on the yaw rate information sensed by the yaw rate sensor.

The section information acquisition unit 34 acquires the section information that is set by the section setting unit 13 via communication with the communication server 101. When the target route of the host vehicle is already set, the section information acquisition unit 34 may acquire only the section information on the sections that are located on the target route and/or near to the target route. The section information acquisition unit 34 recognizes the communication established sections, communication interrupted sections, and communication vehicle absence sections that are set on the map, based on the section information.

The travel plan generation unit 35 generates a travel plan for causing the host vehicle to travel, by the system driven control, toward the destination that is set by the driver in advance. When the destination is set, the travel plan generation unit 35 searches for a target route for the host vehicle to arrive at the destination, based on the position of the host vehicle on the map and the map information. When there is a plurality of target route candidates leading to the destination, the travel plan generation unit 35 searches for a target route that includes only communication established sections before arriving at the destination, based on the section information acquired by the section information acquisition unit 34. If there is no target route that includes only communication established sections before arriving at the destination, the travel plan generation unit 35 may search for a target route that includes communication vehicle absence sections and/or communication interrupted sections. In this case, the travel plan generation unit 35 uses a target route that is one of the plurality of target route candidates and that has the highest ratio of communication established sections.

The travel plan generation unit 35 may acquire the road condition information (information on the road conditions the communication vehicles provided to the communication server 101) via communication with the communication server 101 and, using the acquired road condition information, search for a target route with fewer obstacles.

When a target route is used, the travel plan generation unit 35 acquires the road condition information on the target route via communication with the communication server 101. The travel plan generation unit 35 generates a travel plan for use by the system driven control, based on the target route, the map information, the road condition information, the road condition around the host vehicle recognized by the road condition recognition unit 32, and the traveling state of the host vehicle recognized by the traveling state recognition unit 33.

For example, a travel plan includes the control target value of the host vehicle for a position on the target route of the host vehicle. The positions on the target route are positions in the extending direction of the target route on the map. The positions on the target route mean set longitudinal positions that are set at predetermined intervals (for example, at one-meter intervals) in the extending direction of the target route. The control target value is the value of a control target of the vehicle used in the travel plan. The control target value is set in association with each set longitudinal position on the target route. The travel plan generation unit 35 generates a travel plan by setting the set longitudinal positions at predetermined intervals on the target route and, at the same time, setting the control target value (for example, the target lateral position and the target vehicle speed) for each set longitudinal position. The set longitudinal position and the target lateral position may be set by combining into one set of positional coordinates. The set longitudinal position and the target lateral position mean the longitudinal position information and the lateral position information that are set as a target in the travel plan.

The method of generating a travel plan and the contents of a travel plan are not limited to those described above. The travel plan generation unit 35 may generate a travel plan appropriate for executing the system driven control by using the road condition information acquired via communication with the communication server 101.

The section determination unit 36 determines whether the host vehicle is traveling in a communication established section, based on the position of the host vehicle on the map and the section information. In addition, the section determination unit 36 determines whether the host vehicle is traveling in a communication interrupted section, based on the position of the host vehicle on the map and the section information. Similarly, the section determination unit 36 determines whether the host vehicle is traveling in a communication vehicle absence section, based on the position of the host vehicle on the map and the section information.

The vehicle control unit 37 performs the vehicle control of the host vehicle. The vehicle control unit 37 performs the vehicle control by sending the control signal to the actuator 27. If the start of the system driven control is requested by the operation of the driver and if it is determined by the section determination unit 36 that the host vehicle is traveling in a communication established section, the vehicle control unit 37 performs the system driven control of the host vehicle. The vehicle control unit 37 performs the system driven control of the host vehicle based on the map information, the position of the host vehicle on the map, the road conditions around the host vehicle, the traveling sate of the host vehicle, the road condition information acquired via communication with the communication server 101, and the travel plan generated by the travel plan generation unit 35.

If it is determined that the host vehicle is traveling in a communication established section but if the communication between the host vehicle and the communication server 101 is interrupted for a predetermined time or more, the vehicle control unit 37 may terminate the system driven control and switch the control to the driver driven control.

If the start of the system driven control is requested but if it is determined by the section determination unit 36 that the host vehicle is traveling in a communication interrupted section, the vehicle control unit 37 does not perform the system driven control of host vehicle but performs the driver driven control of the host vehicle because the communication between the communication server 101 and the host vehicle is interrupted.

The vehicle control unit 37 performs the driver driven control (for example, driving assistance control that is known) based on the driving operation of the driver, the road condition around the host vehicle, and the traveling state of the host vehicle.

In other words, when the host vehicle is traveling in a communication interrupted section, the vehicle control unit 37 uses a vehicle control assistance level lower than that used when the host vehicle is traveling in a communication established section. For example, the vehicle control unit 37 switches the control from the system driven control, corresponding to the autonomous driving level 3, to the driver driven control corresponding to the autonomous driving level 2.

Similarly, if the start of the system driven control is requested but if it is determined by the section determination unit 36 that the host vehicle is traveling in a communication vehicle absence section, the vehicle control unit 37 performs the driver driven control of the host vehicle.

In addition, if the length of the communication established section in which the host vehicle not performing the system driven control is traveling (that is, the host vehicle is traveling under the driver driven control or in the manual operation mode) is equal to or smaller than the set threshold, the vehicle control unit 37 does not perform the system driven control in that communication established section. The set threshold value is a value that is set in advance. The set threshold value may be a fixed value or may be a value that is changed according to the vehicle speed of the host vehicle, traffic jam condition, and so on. The vehicle control unit 37 may set the set threshold to a smaller value as the density of other vehicles (for example, the number of other vehicles per unit distance) in the communication established section, in which the host vehicle is traveling or is to travel, is higher. When a target route is set, the length of the communication established section to be compared with the set threshold may be the length of the communication established section on the target route (that is, when the target route branches off into an alleyway in the middle of the communication established section, the length of the communication established section is the length from the entrance of the communication established section to the branch point).

Before switching from the system driven control to the driver driven control, the vehicle control unit 37 notifies (alerts) the driver via the HMI 26 that the control will be switched to the driver driven control. The HMI 26 notifies the driver that the control will be switched to driver driven control by an image display on the display and/or an audio output from the speaker. When the control can be switched from the driver driven control to the system driven control (that is, when the host vehicle under the driver driven control enters a communication established section), the vehicle control unit 37 may suggest the driver that the control should be switched to the system driven control. If the driver permits the switching to the system driven control, the vehicle control unit 37 switches the control from driver driven control to system driven control. If the driver has set, in advance, the automatic switching to the system driven control, the vehicle control unit 37 may notify the driver that the control will be switched from the driver driven control to the system driven control and, then, switch the control from the driver driven control to the system driven control.

In addition, while the driver driven control (or manual driving) of the host vehicle is performed, the vehicle control device 102 may search for a route that includes a communication established section based on the latest section information and, if such a route is found, may propose that the target route be changed. For example, in FIG. 2, assume that the vehicle control device 102 provides the driver with the guidance information notifying the driver that the route including route B is the target route to the destination G. In this case, based on the latest section information, the travel plan generation unit 35 recognizes route A that is parallel to route B composed of the communication interrupted section and that includes the communication established section. Upon recognizing route A that is different from the target route and that is composed of the communication established section, the travel plan generation unit 35 proposes the driver, via the HMI 26, that the target route be changed to a new target route that includes route A (that is, proposes that the system driven control be performed by changing the target route). When the driver permits the change, the travel plan generation unit 35 changes the target route to the route that includes route A. The vehicle control unit 37 performs the system driven control if it is determined that the host vehicle is to travel in the communication established section.

If a communication established section, a communication interrupted section, and a communication vehicle absence section are set on a road basis and, on a multiple-lane road, if there is a section in which a communication established section and a communication interrupted section overlap, the vehicle control device 102 may propose the driver that the host vehicle should travel in the lane in which a communication vehicle that has successfully established the communication has traveled. The vehicle control unit 37 performs the system driven control if it is determined that the host vehicle is to travel in a communication established section.

In addition, if a communication established section, a communication interrupted section, and a communication vehicle absence section are set on a lane basis, the vehicle control device 102 may propose the driver that the lane be changed so that the host vehicle travels in the communication established section. More specifically, if it is recognized that there is a communication interrupted section (or communication vehicle absence section) in the traveling lane in which the host vehicle travels and that there is a communication established section in the lane adjacent to the traveling lane, the travel plan generation unit 35 proposes the driver that the lane be changed to the lane in the communication established section. If it is determined, as a result of a lane change, that the host vehicle is to travel in the communication established section, the vehicle control unit 37 performs the system driven control. Another mode is also possible in which, when the driver permits the change, the vehicle control unit 37 automatically changes the lane to a lane in the communication established section.

If it is recognized, during the execution of the system driven control of the host vehicle, that a communication interrupted section is newly set on the target route of a travel plan based on the latest section information, the vehicle control device 102 may propose the driver to change the route. For example, in FIG. 2, assume that the host vehicle M has a travel plan according to which the host vehicle will pass through route B. At this time, if it is recognized that a communication interrupted section is newly set in route B based on the latest section information, the travel plan generation unit 35 re-searches for a target route. If route A composed of a communication established section is searched for as a result of the re-search, the travel plan generation unit 35 proposes the driver, via the HMI 26, that the target route be changed to the route that includes route A. For continued execution of the system driven control, the travel plan generation unit 35 proposes the driver that the target route be changed to the route that includes route A. The travel plan generation unit 35 changes the target route to the route including route A when the driver permits the change. The vehicle control unit 37 changes the target route to the route including route A and continues the system driven control.

In addition, if it is determined, during the execution of the system driven control of the host vehicle, that the host vehicle is traveling in a section where a communication established section and a communication interrupted section overlap (that is, if it is determined that the host vehicle is traveling in a communication established section and, at the same time, in a communication interrupted section), the vehicle control unit 37 may perform the system driven control so that the host vehicle travels along the traveling trajectory of a communication vehicle that successfully performed the communication with the communication server 101. In some cases, a position where the communication between the communication server 101 and the host vehicle is interrupted and a position where the communication between them is established are mixed even on the same road (or in the same lane). Therefore, if it is determined that the host vehicle is traveling in a section where a communication established section and a communication interrupted section overlap, the vehicle control unit 37 can cause the host vehicle to travel along the traveling trajectory of a communication vehicle that is determined to have established the communication with the communication server 101, thus avoiding an interruption in the communication.

[Processing of Vehicle Communication System]

The processing of the vehicle communication system 100 according to the present embodiment will be described below.

<Setting Processing of a Communication Established Section and a Communication Vehicle Absence Section>

FIG. 3A is a flowchart showing the setting processing of a communication established section and a communication vehicle absence section. The flowchart shown in FIG. 3A is executed as necessary in the communication server 101.

In S10, the communication server 101 uses the communication vehicle position recognition unit 11 to recognize the positions of the communication vehicles on the map as shown in FIG. 3A. The communication vehicle position recognition unit 11 communicates with a plurality of communication vehicles to recognize the positions of the communication vehicles on the map. After that, the processing of the communication server 101 proceeds to S12.

In S12, the communication server 101 uses the section setting unit 13 to determine whether the communication between the communication server 101 and the communication vehicles has continued for a predetermined time or more. If it is not determined that the communication with the communication vehicles has continued for a predetermined time or more (S12: NO), the communication server 101 terminates the current processing. If it is determined that the communication with the communication vehicles has continued for a predetermined time or more (S12: YES), the processing of the communication server 101 proceeds to S14.

In S14, the communication server 101 uses the section setting unit 13 to set a communication established section and a communication vehicle absence section. For example, the section setting unit 13 sets a section in which the communication vehicles that continue communication with the communication server 101 are traveling as a communication established section. The section setting unit 13 sets a section in which there is no communication vehicle that is communicating with the communication server 101 as a communication vehicle absence section. After that, the communication server 101 terminates the current processing.

<Setting Processing of a Communication Interrupted Section>

FIG. 3B is a flowchart showing the setting processing of a communication interrupted section. The flowchart shown in FIG. 3B is executed as necessary in the communication server 101.

In S20, the communication server 101 uses the communication vehicle position recognition unit 11 to recognize the positions of the communication vehicles on the map as shown in FIG. 3B. The communication vehicle position recognition unit 11 communicates with a plurality of communication vehicles to recognize the positions of the communication vehicles on the map. After that, the processing of the communication server 101 proceeds to S22.

In S22, the communication server 101 uses the section setting unit 13 to determine whether a communication interruption point is recognized. The communication interruption point is a point where the communication of a certain number or more of communication vehicles is interrupted. If it is not determined that the communication interruption point, where the communication of a certain number or more of communication vehicles is interrupted, is recognized (S22: NO), the communication server 101 terminates the current processing. If it is determined that the communication interruption point, where the communication of a certain number or more of communication vehicles is interrupted, is recognized (S22: YES), the processing of the communication server 101 proceeds to S24.

In S24, the communication server 101 uses the section setting unit 13 to determine whether a communication restoration point is recognized. The communication restoration point is a point where the communication of a certain number or more of communication vehicles whose communication was interrupted at the same communication interruption point is restored. If it is not determined that the communication restoration point, where the communication of a certain number or more of communication vehicles is restored, is recognized (S24: NO), the communication server 101 terminates the current processing. If it is determined that the communication restoration point, where the communication of a certain number or more of communication vehicles is restored, is recognized (S24: YES), the processing of the communication server 101 proceeds to S26.

In S26, the communication server 101 uses the section setting unit 13 to set a communication interrupted section. The section setting unit 13 sets the section between the communication interruption point and the communication restoration point as a communication interrupted section. After that, the communication server 101 terminates the current processing.

<Release Processing of a Communication Established Section>

Figure 4A:
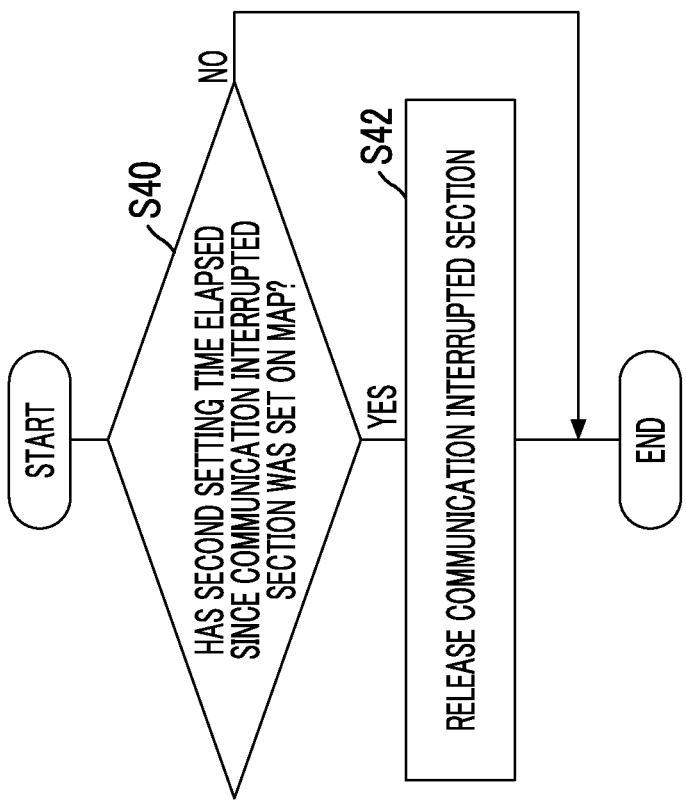
FIG. 4A is a flowchart showing the release processing of a communication established section.

FIG. 4A is a flowchart showing the release processing of a communication established section. The flowchart shown in FIG. 4A is executed when a communication established section was set.

In S30, the communication server 101 uses the section setting unit 13 to determine whether the first setting time has elapsed since the communication established section was set, as shown in FIG. 4A. If it is not determined that the first setting time has elapsed since the communication established section was set (S30: NO), the communication server 101 terminates the current processing. The communication server 101 repeats the processing of S30 again after a certain time has elapsed. If it is determined that the first setting time elapsed since the communication established section was set (S30: YES), the processing of the communication server 101 proceeds to S32.

In S32, the communication server 101 uses the section setting unit 13 to release the communication established section. When the communication established section is released, the communication server 101 completes the release processing of the communication established section.

<Release Processing of a Communication Interrupted Section>

Figure 4B:
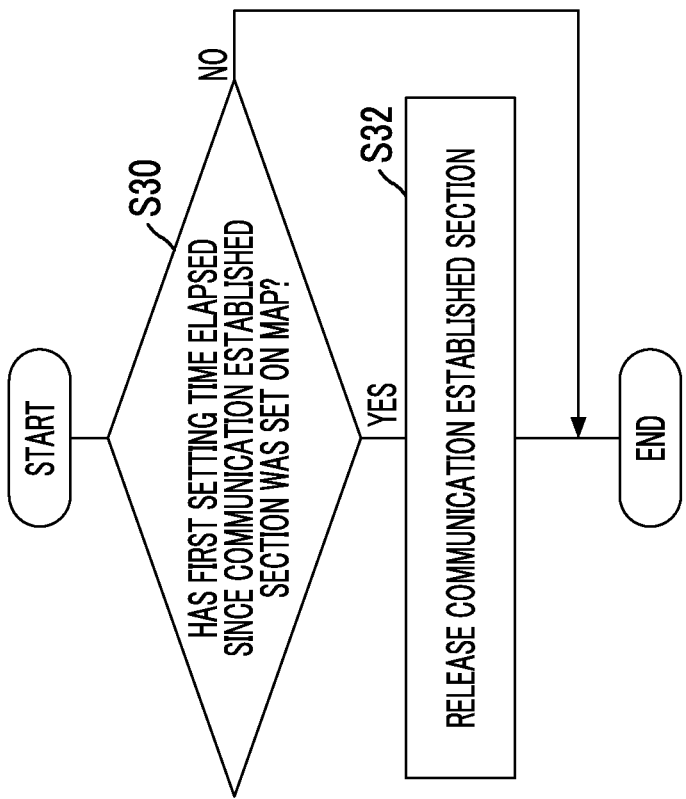
FIG. 4B is a flowchart showing the release processing of a communication interrupted section.

FIG. 4B is a flowchart showing the release processing of a communication interrupted section. The flowchart shown in FIG. 4B is executed when a communication interrupted section was set.

In S40, the communication server 101 uses the section setting unit 13 to determine whether the second setting time has elapsed since the communication interrupted section was set, as shown in FIG. 4B. If it is not determined that the second setting time has elapsed since the communication interrupted section was set (S40: NO), the communication server 101 terminates the current processing. The communication server 101 repeats the processing of S40 again after a certain time has elapsed. If it is determined that the second setting time has elapsed since the communication interrupted section was set (S40: YES), the processing of the communication server 101 proceeds to S42.

In S42, the communication server 101 uses the section setting unit 13 to release the communication interrupted section. After releasing the communication interrupted section, the communication server 101 completes the release processing of the communication interrupted section.

<Vehicle Control Performed by the Vehicle Control Device>

Figure 5:
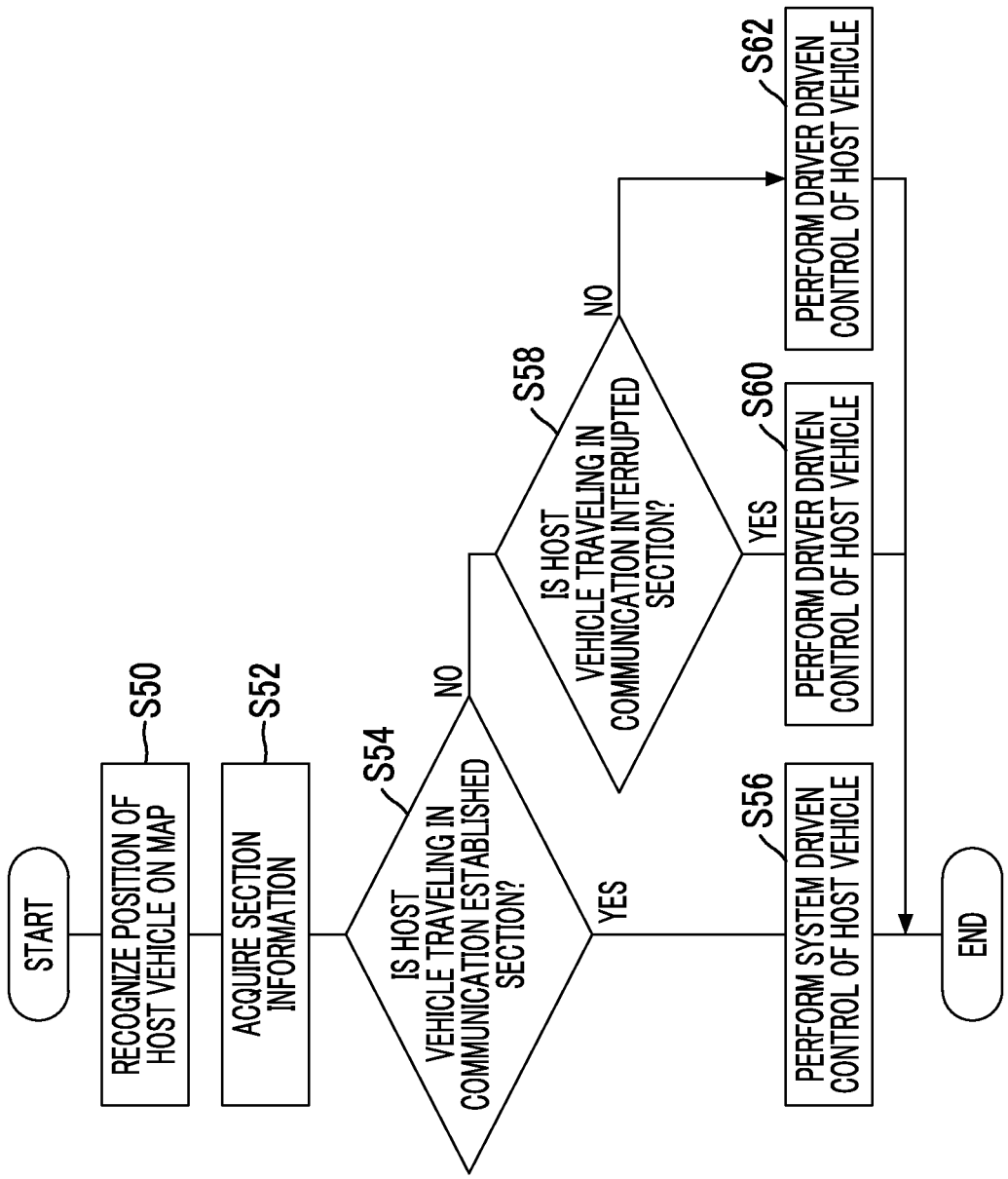
FIG. 5 is a flowchart showing vehicle control performed by a vehicle control device.

FIG. 5 is a flowchart showing vehicle control performed by the vehicle control device. The flowchart shown in FIG.

5 is executed, for example, when a driver's operation to request to start the system driven control is recognized.

As shown in FIG. 5, in S50, the ECU 30 of the vehicle control device 102 uses the vehicle position recognition unit 31 to recognize the position of the host vehicle on the map. The vehicle position recognition unit 31 recognizes the position of the host vehicle on the map based on the position information received by the GPS receiver 21 and the map information stored in the vehicle side map database 25. After that, the processing of the ECU 30 proceeds to S52.

In S52, the ECU 30 uses the section information acquisition unit 34 to acquire the section information. The section information acquisition unit 34 acquires the section information, which was set by the section setting unit 13, via communication with the communication server 101. After that, the processing of the ECU 30 proceeds to S54.

In S54, the ECU 30 uses the section determination unit 36 to determine whether the host vehicle is traveling in a communication established section. The section determination unit 36 determines whether the host vehicle is traveling in a communication established section, based on the position of the host vehicle on the map and the section information. If it is determined that the host vehicle is traveling in a communication established section (S54: YES), the processing of the ECU 30 proceeds to S56. If it is not determined that the host vehicle is traveling in a communication established section (S54: NO), the processing of the ECU 30 proceeds to S58.

In S56, the ECU 30 uses the vehicle control unit 37 to perform the system driven control of the host vehicle. The vehicle control unit 37 performs the system driven control of the host vehicle based on the map information, the position of the host vehicle on the map, the road conditions around the host vehicle, the traveling state of the host vehicle, the road condition information acquired via communication with the communication server 101, and the travel plan generated by the travel plan generation unit 35. The vehicle control unit 37 causes the host vehicle to travel by the system driven control in the communication established section. After that, the ECU 30 terminates the current processing and, after a predetermined time elapses, repeats the processing from S50 again. If the host vehicle is under the driver driven control, the ECU 30 performs the system driven control after obtaining permission from the driver.

In S58, the ECU 30 uses the section determination unit 36 to determine whether the host vehicle is traveling in a communication interrupted section. The section determination unit 36 determines whether the host vehicle is traveling in an communication interrupted section, based on the position of the host vehicle on the map and the section information. If it is determined that the host vehicle is traveling in a communication interrupted section (S58: YES), the processing of the ECU 30 proceeds to S60. If it is not determined that the host vehicle is traveling in a communication interrupted section (S58: NO), the processing of the ECU 30 proceeds to S62.

In S60, the ECU 30 uses the vehicle control unit 37 to perform the driver driven control of the host vehicle. The vehicle control unit 37 performs the driver driven control of the host vehicle based on the driving operation of the driver, the road condition around the host vehicle, and the traveling state of the host vehicle. The vehicle control unit 37 causes the host vehicle to travel by the driver driven control in the communication interrupted section. After that, the ECU 30 terminates the current processing and, after a predetermined time elapses, repeats the processing from S50 again. If the host vehicle is under the system driven control, the ECU 30 executes the driver driven control after alerting the driver.

In S62, the ECU 30 uses the vehicle control unit 37 to perform the driver driven control of the host vehicle. The processing in S62 is the same as that in S60 and, therefore, the description is omitted. After that, the ECU 30 terminates the current processing and, after a predetermined time elapses, repeats the processing from S50 again.

<Vehicle Control Switching Restriction Processing>

Figure 6:
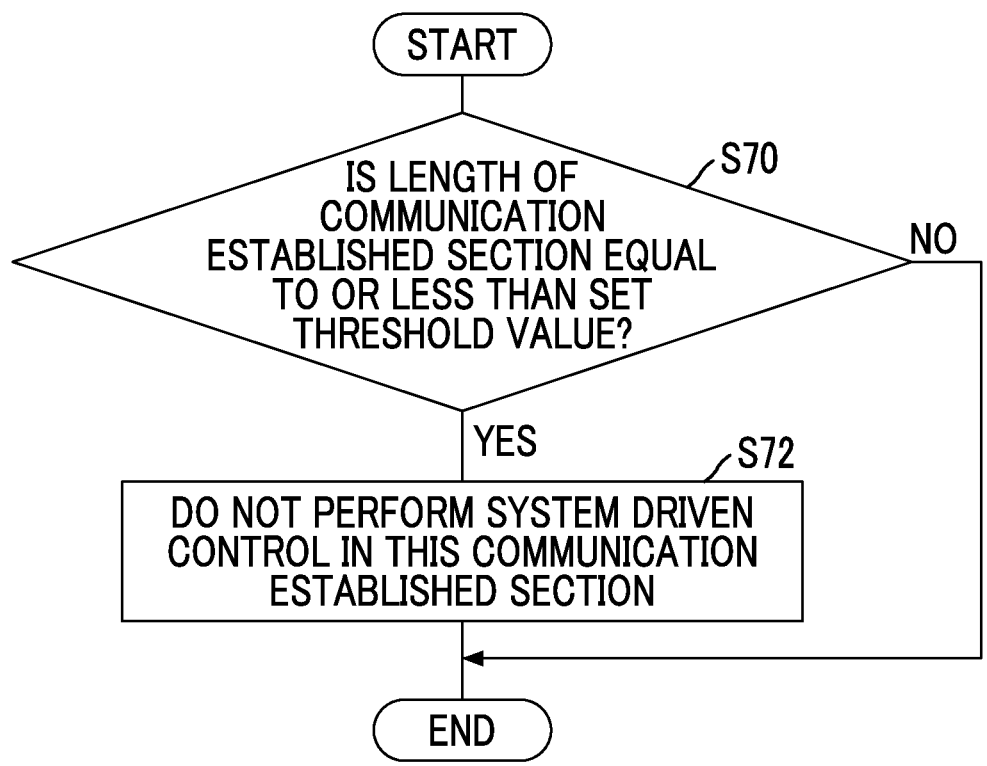
FIG. 6 is a flowchart showing the vehicle control switching restriction processing.

FIG. 6 is a flowchart showing the vehicle control switching restriction processing. The flowchart shown in FIG. 6 is executed, for example, when the vehicle control device 102 acquires the section information that includes the information on a communication established section. The flowchart shown in FIG. 6 is executed for each communication established section. The flowchart shown in FIG. 6 may also be executed when the host vehicle enters a communication established section.

As shown in FIG. 6, the ECU 30 uses the section determination unit 36 to determine whether the length of a communication established section is equal to or less than the set threshold value. If it is not determined that the length of the communication established section is equal to or less than the set threshold value (S70: NO), the ECU 30 terminates the current processing. If it is determined that the length of the communication established section is equal to or less than the set threshold (S70: YES), the processing of the ECU 30 proceeds to S72.

In S72, the ECU 30 uses the vehicle control unit 37 to set that the system driven control will not be performed in the communication established section. After that, the ECU 30 terminates the current processing. The vehicle control unit 37 does not perform the system driven control even when it is determined that the host vehicle is traveling in the communication established section.

[Effect of Vehicle Communication System]

The vehicle communication system 100 in this embodiment described above sets a communication established section and a communication interrupted section on the map based on the positions of the communicating communication vehicles on the map. The vehicle communication system performs the system driven control of the host vehicle when the host vehicle travels in a communication established section and, at the same time, performs the driver driven control of the host vehicle when the host vehicle travels in a communication interrupted section. In this way, the vehicle communication system 100 performs vehicle control appropriately according to the communication environment of a section in which the host vehicle travels.

The vehicle communication system 100 further sets a communication vehicle absence section on the map based on the positions of the communicating communication vehicles on the map and, when the host vehicle travels in a communication vehicle absence section, performs the driver driven control. In this way, the vehicle communication system 100 performs the vehicle control of the host vehicle appropriately considering a section in which there is no communication vehicle.

Furthermore, the vehicle communication system 100 does not perform the system driven control if the length of a communication established section is equal to or less than the set threshold value because, in this case, the system driven control can be executed only for a short period of time and, immediately after the short period of time, the vehicle control is switched again to the driver driven control. This avoids the frequent switching of vehicle control.

Furthermore, considering that the communication environment of a section varies with the elapse of time, the vehicle communication system 100 releases the setting of a communication established section and a communication interrupted section when a certain time has elapsed, allowing vehicle control to be performed appropriately according to the actual communication environment.

Although preferred embodiments of the present disclosure have been described above, the present disclosure is not limited to the above-described embodiments. The present disclosure can be implemented not only in the embodiments described above but also in various forms to which various modifications and improvements are added based on the knowledge of those skilled in the art.

For example, the section setting unit 13 may set a communication established section, a communication interrupted section, or a communication vehicle absence section for each section that is set in advance on the map. The sections that are set in advance may be formed by dividing a road into sections, one for each intersection or each branch point, or may be formed by dividing a road at fixed intervals. Any method may be used to form a section that is set in advance.

The section setting unit 13 may set the traveling range of communication vehicles in communication with the communication server 101 as a communication established section even if the communication with the communication server 101 does not continue for a predetermined time or more. The section setting unit 13 does not necessarily have to release a communication established section and/or a communication interrupted section when a predetermined time elapses.

The section determination unit 36 may determine whether the host vehicle is to travel in a communication established section, based on the position of the host vehicle on the map and the section information. The section determination unit 36 may determine whether the host vehicle is to travel in a communication interrupted section, based on the position of the host vehicle on the map and the section information. The section determination unit 36 may also determine whether the host vehicle is to travel in a communication vehicle absence section, based on the position of the host vehicle on the map and the section information.

The vehicle control device 102 does not necessarily have to include the vehicle side map database 25, but may acquire the map information, for example, from the communication server 101. The vehicle control device 102 may set a target route using a known navigation system instead of the travel plan generation unit 35.

If it is determined that the host vehicle is traveling in a communication vehicle absence section, the vehicle control unit 37 need not perform the driver driven control in the same way as when the host vehicle is determined to be traveling in a communication interrupted section. If it is determined that the host vehicle is traveling in a communication vehicle absence section, the vehicle control unit 37 may perform the system driven control specifically provided for a communication vehicle absence section while the communication between the communication server 101 and the host vehicle is established.

Furthermore, even if the length of a communication established section in which the host vehicle travels not under the system driven control is equal to or smaller than the set threshold, the vehicle control unit 37 may perform the system driven control in that communication established section.

The system driven control for a communication vehicle absence section is autonomous driving control with an assistance level lower than that of the system driven control that is performed when it is determined that the host vehicle is traveling in a communication established section. The system driven control for a communication vehicle absence section is thought of as vehicle control with a smaller upper limit of the vehicle speed and/or a smaller upper limit of the amount of change in the steering angle of the host vehicle (temporal differentiation of steering angle) than that in the system driven control for a communication established section. The system driven control for a communication established section may be considered as control corresponding to autonomous driving level 4, and the system driven control for a communication vehicle absence section as control corresponding to autonomous driving level 3. When the communication between the communication server 101 and the host vehicle is interrupted for a predetermined time or more, the vehicle control unit 37 notifies the driver about the interruption and, then, switches the system driven control for a communication vehicle absence section to the driver driven control.

In addition, the vehicle control unit 37 may be configured in the mode described below with consideration for preventive safety services. That is, the vehicle control unit 37 may perform warning control if it is determined that the host vehicle is traveling in a communication established section, may perform alerting control if it is determined that the host vehicle is traveling in a communication vehicle absence section, and may cause the driver to perform the manual driving if it is determined that the host vehicle is traveling in a communication interrupted section. In this configuration, when a communication established section becomes a communication vehicle absence section as the time elapses, the server side map database 14 may still store the obstacle information on a static obstacle (such as a falling object), which was recognized when the section was a communication established session, even after the section has become a communication vehicle absence section. This means that, when it is determined that the host vehicle is traveling in a communication vehicle absence section, the vehicle control unit 37 can perform alerting control using the obstacle information on a static obstacle that was recognized when the section was a communication established section. That is, if it is determined that the host vehicle is traveling in a communication vehicle absence section and if there is obstacle information on a static obstacle that has been held, the vehicle control unit 37 can perform alerting control that alerts the driver to the static obstacle, thus improving the quality of preventive safety services. For the obstacle information on a dynamic obstacle such as a pedestrian, the server side map database 14 discards the obstacle information when a communication established section becomes a communication vehicle absence section when as the time elapses. As a result, this mode can contribute to improving the quality of preventive safety services while saving the amount of data smaller than that in the mode when the obstacle information on all obstacles is held.

What is claimed is:

1. A vehicle communication system comprising:
   a communication server configured to communicate with a plurality of communication vehicles, the communication vehicles being vehicles configured to communicate with the communication server, the communication server configured to:
   recognize positions of communicating communication vehicles on a map via communication with the communication vehicles, the communicating communication vehicles being included in the plurality of communication vehicles and being in communication with the communication server, and set a communication established section and a communication interrupted section on the map, based on the positions of the communicating communication vehicles on the map; and a vehicle control device configured to communicate with the communication server and configured to perform vehicle control of a host vehicle using an actuator mounted on the host vehicle, the vehicle control device including at least one electronic control unit configured to recognize a position of the host vehicle on the map, acquire section information on the communication established section and the communication interrupted section, determine in which section, either the communication established section or the communication interrupted section, the host vehicle is traveling, based on the position of the host vehicle on the map and the section information, and perform system driven control of the host vehicle when the host vehicle travels in the determined communication established section, and perform driver driven control of the host vehicle when the host vehicle travels in the determined communication interrupted section.

2. The vehicle communication system according to claim 1, wherein the at least one electronic control unit is configured to set, as the communication established section, a section in which a communication vehicle of the plurality of communication vehicles that have continued communication with the communication server for a predetermined time or more are traveling, based on the positions of the communicating communication vehicles on the map, and set, as the communication interrupted section, a section in which a certain number or more of communication vehicles of the plurality of communication vehicles have communication interrupted, based on the positions of the communicating communication vehicles on the map.

3. The vehicle communication system according to claim 1, wherein the at least one electronic control unit is configured to set the communication established section, the communication interrupted section, and a communication vehicle absence section on the map based on the positions of the communicating communication vehicles on the map, the at least one electronic control unit is configured to acquire the section information on the communication established section, the communication interrupted section, and the communication vehicle absence section that are set on the map, the at least one electronic control unit is configured to determine which of the communication established section, the communication interrupted section, or the communication vehicle absence section is a section in which, the host vehicle is traveling, based on the position of the host vehicle on the map and the section information, and the at least one electronic control unit is configured to perform the driver driven control when the host vehicle travels in the communication vehicle absence section.

4. The vehicle communication system according to claim 3, wherein the at least one electronic control unit is configured to set, as the communication vehicle absence section, a section in which there is no communicating communication vehicle, based on the positions of the communication vehicles on the map.

5. The vehicle communication system according to claim 1, wherein the at least one electronic control unit is configured not to perform the system driven control in the determined communication established section when a length of the determined communication established section in which the host vehicle not performing the system driven control travels is equal to or less than a threshold value.

6. The vehicle communication system according to claim 1, wherein the at least one electronic control unit is configured to release a setting of the communication established section when a first setting time has elapsed since the communication established section was set on the map, and release a setting of the communication interrupted section when a second setting time has elapsed since the communication interrupted section was set on the map.

7. The vehicle communication system according to claim 6, wherein the first setting time is 30 seconds or more and 1 minute or less, and the second setting time is 30 seconds or more and 3 minutes or less.

8. The vehicle communication system according to claim 1, wherein the at least one electronic control unit is configured to generate a travel plan including candidates of a plurality of routes on which the host vehicle will travel before arriving at a destination, based on the position of the host vehicle on the map and the section information.

9. The vehicle communication system according to claim 8, wherein the at least one electronic control unit is configured to determine, from the candidates of the routes, a traveling route on which the host vehicle will travel based on the section information.

10. The vehicle communication system according to claim 9, wherein the at least one electronic control unit is configured to determine, from the candidates of the routes, a route including a maximum number of the communication established sections as a traveling route cin which the host vehicle will travel, based on the section information.

11. The vehicle communication system according to claim 1, wherein the system driven control is traveling control under which the vehicle control device performs acceleration, deceleration, and steering of the host vehicle autonomously, and the driver driven control is traveling control under which the host vehicle travels based on a driving operation of a driver of the host vehicle.

12. The vehicle communication system according to claim 1, wherein the communication server is configured to communicate road condition information with the plurality of communication vehicles, and the host vehicle is configured to acquire the road condition information from the communication server, and the at least one electronic control unit is configured to perform the system driven control of the host vehicle based on the road condition information when the host vehicle travels in the determined communication established section.

13. A vehicle control device comprising:
at least one electronic control unit configured to:
recognize a position of a host vehicle on a map;
acquire section information on a communication established section and a communication interrupted section via communication with a communication server configured to communicate with a plurality of communication vehicles, the communication vehicles being vehicles configured to communicate with the communication server, the communication established section and the communication interrupted section being set on the map by the communication server based on a status of communication with the communication vehicles;
determine in which section, either the communication established section or the communication interrupted section, the host vehicle is traveling, based on the position of the host vehicle on the map and the section information;
perform vehicle control of the host vehicle using an actuator mounted on the host vehicle, in such a way that system driven control of the host vehicle is performed, when the host vehicle travels in the determined communication established section; and
perform driver driven control of the host vehicle when the host vehicle travels in the determined communication interrupted section.

14. The vehicle control device according to claim 13, wherein the communication server is configured to communicate road condition information with the plurality of communication vehicles, and the at least one electronic control unit is configured to perform the vehicle control of the host vehicle using the actuator mounted on the host vehicle, in such a way that the system driven control of the host vehicle is performed based on the road condition information acquired from the communication server, when the host vehicle travels in the determined communication established section.

15. A vehicle communication system comprising:
a communication server configured to communicate with a plurality of communication vehicles, the communication vehicles being vehicles configured to communicate with the communication server, the communication server being configured to:
recognize positions of communicating communication vehicles on a map via communication with the communication vehicles, the communicating communication vehicles being included in the plurality of communication vehicles and being in communication with the communication server, and
set a communication established section and a communication interrupted section on the map, based on the positions of the communicating communication vehicles on the map; and
a vehicle control device configured to communicate with the communication server and configured to perform vehicle control of a host vehicle using an actuator mounted on the host vehicle,
the vehicle control device including
at least one electronic control unit configured
to recognize a position of the host vehicle on the map,
to acquire section information on the communication established section and the communication interrupted section,
to determine in which section, either the communication established section or the communication interrupted section, the host vehicle is traveling, based on the position of the host vehicle on the map and the section information,
to perform a driving assistance when the host vehicle travels in the determined communication interrupted section, and
to perform high-level driving assistance, the high-level driving assistance having a higher level of intervention in driving control of the vehicle control device than the driving assistance, when the host vehicle travels in the determined communication established section.

16. The vehicle communication system according to claim 15, wherein the communication server is further configured to communicate road condition information with the plurality of communication vehicles, and the host vehicle is configured to acquire the road condition information from the communication service, and the at least one electronic control unit is further configured to perform the high-level driving assistance based on the road condition information when the host vehicle travels in the determined communication established section.

* * * * *